US012012724B2

(12) United States Patent
Kondo et al.

(10) Patent No.: US 12,012,724 B2
(45) Date of Patent: Jun. 18, 2024

(54) HYDRAULIC EXCAVATOR DRIVE SYSTEM

(71) Applicant: KAWASAKI JUKOGYO KABUSHIKI KAISHA, Kobe (JP)

(72) Inventors: Akihiro Kondo, Kobe (JP); Yoshiyuki Tode, Kobe (JP); Hideyasu Muraoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/269,235

(22) PCT Filed: Dec. 27, 2021

(86) PCT No.: PCT/JP2021/048665
§ 371 (c)(1),
(2) Date: Jun. 22, 2023

(87) PCT Pub. No.: WO2022/172636
PCT Pub. Date: Aug. 18, 2022

(65) Prior Publication Data

US 2024/0084823 A1 Mar. 14, 2024

(30) Foreign Application Priority Data

Feb. 12, 2021 (JP) ................................ 2021-020555

(51) Int. Cl.
*E02F 9/22* (2006.01)
*F15B 11/024* (2006.01)

(52) U.S. Cl.
CPC .......... *E02F 9/2217* (2013.01); *E02F 9/2203* (2013.01); *E02F 9/2267* (2013.01);
(Continued)

(58) Field of Classification Search
CPC ........... F15B 11/024; F15B 2011/0243; F15B 2011/0246; F15B 2211/3058; E02F 9/2217
See application file for complete search history.

(56) References Cited

U.S. PATENT DOCUMENTS 4,736,673 A * 4/1988 Harada .................. E02F 3/431 91/522
5,826,486 A * 10/1998 Shimada .............. E02F 9/2217 91/437
(Continued)

FOREIGN PATENT DOCUMENTS

JP H1018356 A * 1/1998 ........... F15B 11/024
JP 2018-105334 A 7/2018

OTHER PUBLICATIONS

JP H1018356 A—Text (Year: 1998).*

*Primary Examiner* — Michael Leslie
(74) *Attorney, Agent, or Firm* — Oliff PLC

(57) ABSTRACT

A hydraulic excavator drive system (1) includes an arm control valve (31) and an arm switching valve (41). The arm switching valve (41) is connected to an arm pushing supply line (34) by a rod-side line (42) and to an arm crowding supply line (35) by a head-side line (43). The arm switching valve (41) is switched between a neutral position, a recycling position in which the arm switching valve (41) allows the rod-side line (42) to communicate with the head-side line (43) and a second tank line (44), and a meter-out control position in which the arm switching valve (41) allows the head-side line (43) to communicate with the tank line (44). The arm switching valve (41) incorporates therein a check valve (45) that allows a flow from the rod-side line (42) toward the head-side line (43) when the arm switching valve (41) is in the recycling position.

2 Claims, 2 Drawing Sheets

(52) U.S. Cl.
CPC .......... *E02F 9/2271* (2013.01); *E02F 9/2275* (2013.01); *F15B 11/024* (2013.01); *E02F 9/2285* (2013.01); *E02F 9/2296* (2013.01); *F15B 2211/3058* (2013.01)

(56) References Cited

U.S. PATENT DOCUMENTS

| | | | | |
|---|---|---|---|---|
| 8,650,778 | B2 * | 2/2014 | Okano | E02F 9/2285<br>172/3 |
| 10,844,886 | B2 * | 11/2020 | Kondo | E02F 9/2285 |
| 10,914,328 | B2 * | 2/2021 | Ogawa | E02F 9/226 |
| 11,739,502 | B2 * | 8/2023 | Kumagai | F15B 11/024<br>60/459 |
| 11,815,109 | B2 * | 11/2023 | Nose | E02F 9/2217 |
| 11,927,205 | B2 * | 3/2024 | Hishinuma | E02F 9/2239 |
| 2019/0323527 | A1 | 10/2019 | Kondo et al. | |
| 2021/0123213 | A1 * | 4/2021 | Maekawa | E02F 9/2282 |
| 2024/0052599 | A1 * | 2/2024 | Kondo | F15B 13/06 |

* cited by examiner

HYDRAULIC EXCAVATOR DRIVE SYSTEM

CROSS-REFERENCE TO RELATED APPLICATIONS

This application is a national stage application of PCT/JP2021/048665 filed Dec. 27, 2021, which claims the benefit of and priority to Japanese Patent Application No. 2021-020555, filed Feb. 12, 2021. The disclosures of the prior applications are hereby incorporated by reference herein in its entirety.

TECHNICAL FIELD

The present invention relates to a hydraulic excavator drive system.

BACKGROUND ART

Generally speaking, in a hydraulic excavator, an arm is swingably coupled to the distal end of a boom that is luffed relative to a slewing structure, and a bucket is swingably coupled to the distal end of the arm. A drive system installed in such a hydraulic excavator includes, for example, a boom cylinder that drives the boom, an arm cylinder that drives the arm, and a bucket cylinder that drives the bucket. These hydraulic actuators are supplied with hydraulic oil from a pump via control valves.

For example. Patent Literature 1 discloses a hydraulic system that is incorporable in a hydraulic excavator. In the hydraulic system, a single-rod hydraulic cylinder is connected to a control valve by a head-side line and a rod-side line, and the control valve is connected to a pump by a pump line and connected to a tank by a tank line.

Patent Literature 1 describes that in a case where the hydraulic system is incorporated in a hydraulic excavator, the hydraulic cylinder may be an arm cylinder that extends at arm crowding and retracts at arm pushing. In this case, the head-side line serves as an arm crowding supply line, and the rod-side line serves as an arm pushing supply line.

Further, in the hydraulic system of Patent Literature 1, hydraulic oil that is discharged from the hydraulic cylinder through the rod-side line when the cylinder extends is supplied to the head-side line at the hydraulic cylinder side with respect to the control valve (i.e., the hydraulic oil is recycled). In a case where the hydraulic cylinder is an arm cylinder of a hydraulic excavator, the hydraulic oil is recycled at arm crowding.

Specifically, a rod-side supply line is connected to a head-side supply line by a recycling line, and a recycling valve is located on the recycling line. Also, a switching valve is located on the recycling line. The switching valve functions as a check valve that allows a flow from the rod-side line toward the head-side line but prevents the reverse flow when the hydraulic oil is recycled. That is, the hydraulic oil is recycled when the pressure of the head-side line is lower the pressure of the rod-side line.

CITATION LIST

Patent Literature

PTL 1: Japanese Laid-Open Patent Application Publication No. 2018-105334

SUMMARY OF INVENTION

Technical Problem

In a case where the hydraulic cylinder of the hydraulic system of Patent Literature 1 is an arm cylinder of a hydraulic excavator, the control valve is an arm control valve. Generally speaking, in the case of a hydraulic excavator, for each of an arm crowding operation and an arm pushing operation, meter-in control and meter-out control are performed by the arm control valve. For such a hydraulic excavator drive system, there is a desire to recycle the hydraulic oil at arm crowding and to perform meter-out control independently of meter-in control at arm pushing.

In view of the above, an object of the present disclosure is to provide a hydraulic excavator drive system that makes it possible to perform, with a low-cost simple circuit that includes a small number of components, hydraulic oil recycling at arm crowding and independent meter-out control at arm pushing.

Solution to Problem

In order to solve the above-described problems, a hydraulic excavator drive system according to the present disclosure includes: an arm cylinder that extends at arm crowding and retracts at arm pushing; an arm control valve connected to the arm cylinder by an arm crowding supply line and an arm pushing supply line, connected to a pump by a pump line, and connected to a tank by a first tank line; and an arm switching valve connected to the arm pushing supply line by a rod-side line, connected to the arm crowding supply line by a head-side line, and connected to the tank by a second tank line. The arm switching valve is switched between a neutral position, a recycling position, and a meter-out control position, the neutral position being a position in which the arm switching valve blocks the rod-side line, the head-side line, and the second tank line, the recycling position being a position in which the arm switching valve allows the rod-side line to communicate with the head-side line and the second tank line, the meter-out control position being a position in which the arm switching valve allows the head-side line to communicate with the second tank line. The arm switching valve incorporates therein a check valve that allows a flow from the rod-side line toward the head-side line when the arm switching valve is in the recycling position.

According to the above configuration, at arm crowding, by switching the arm switching valve to the recycling position, the hydraulic oil can be recycled when the pressure of the arm crowding supply line is lower than the pressure of the arm pushing supply line. On the other hand, at arm pushing, by switching the arm switching valve to the meter-out control position, meter-out control by the arm switching valve can be performed independently of meter-in control by the arm control valve. Therefore, hydraulic oil recycling at arm crowding and independent meter-out control at arm pushing can be performed with a low-cost simple circuit that includes a small number of components and that uses, as a valve, only the arm switching valve, in which the check valve is incorporated.

Advantageous Effects of Invention

The present disclosure provides a hydraulic excavator drive system that makes it possible to perform, with a low-cost simple circuit that includes a small number of components, hydraulic oil recycling at arm crowding and independent meter-out control at arm pushing.

DESCRIPTION OF EMBODIMENTS

Figure 1:
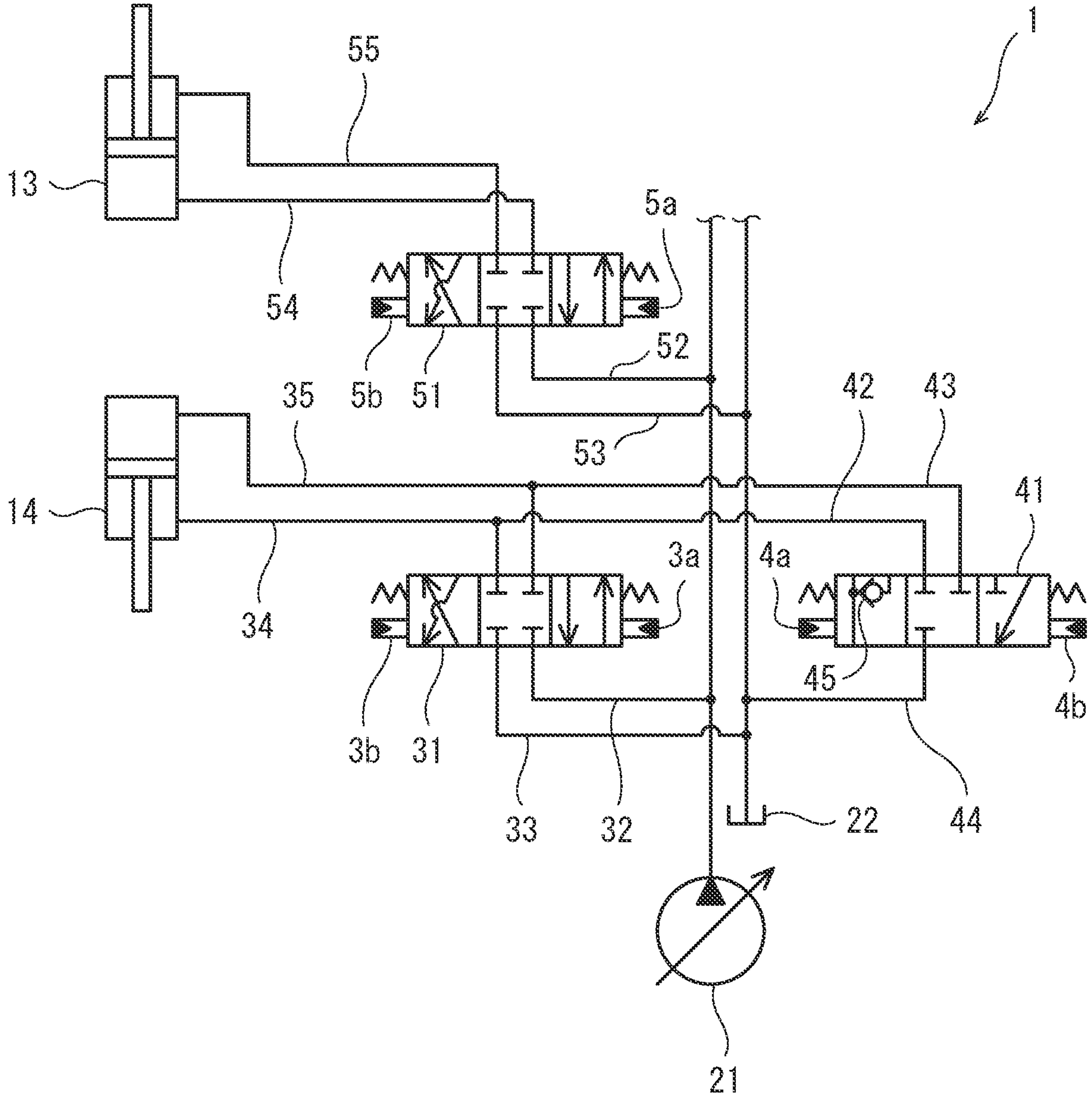
FIG. 1 shows a schematic configuration of a hydraulic excavator drive system according to one embodiment of the present disclosure.
Figure 2:
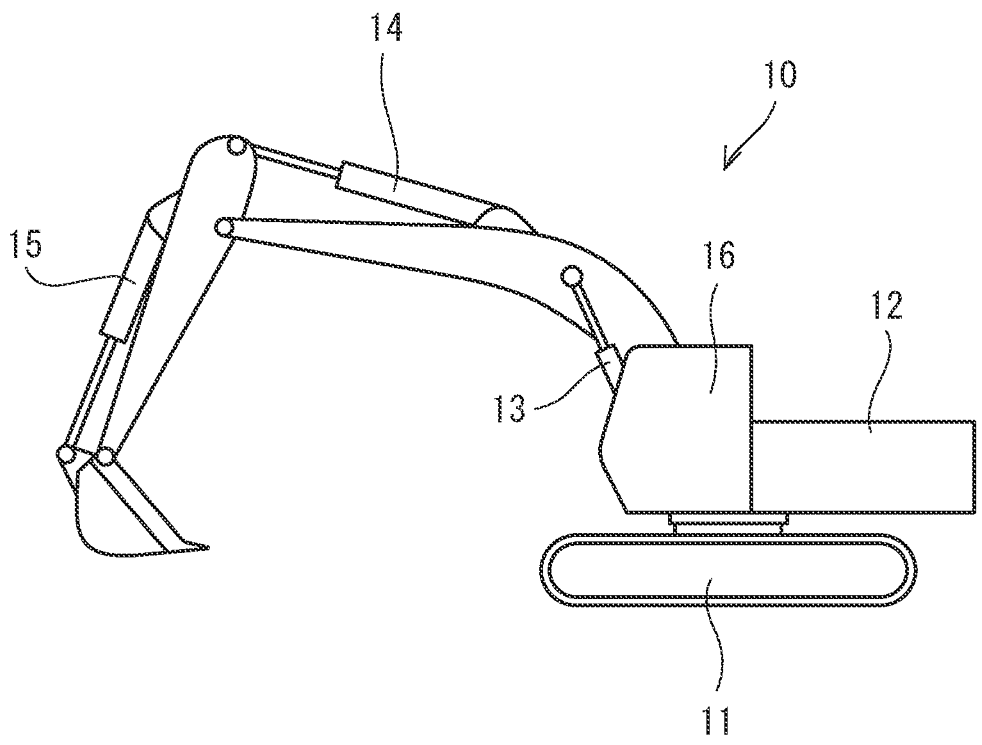
FIG. 2 is a side view of a hydraulic excavator.

FIG. 1 shows a hydraulic excavator drive system 1 according to one embodiment of the present disclosure. FIG. 2 shows a hydraulic excavator 10, in which the drive system 1 is installed.

The hydraulic excavator 10 shown in FIG. 2 is a self-propelled hydraulic excavator, and includes a traveling structure 11. The hydraulic excavator 10 further includes a slewing structure 12 and a boom. The slewing structure 12 is slewably supported by the traveling structure 11. The boom is luffable relative to the slewing structure 12. An arm is swingably coupled to the distal end of the boom, and a bucket is swingably coupled to the distal end of the arm. The slewing structure 12 includes a cabin 16. The cabin 16 includes a driver's seat. The hydraulic excavator 10 need not be of a self-propelled type.

The drive system 1 includes, as hydraulic actuators, a boom cylinder 13, an arm cylinder 14, and a bucket cylinder 15, which are shown in FIG. 2, and an unshown slewing motor and a pair of unshown travel motors (a left travel motor and a right travel motor). The boom cylinder 13 luffs the boom. The arm cylinder 14 swings the arm. The bucket cylinder 15 swings the bucket. The slewing motor slews the slewing structure 12. The left travel motor rotates the left crawler of the traveling structure 11, and the right travel motor rotates the right crawler of the traveling structure 11.

As shown in FIG. 1, the drive system 1 further includes a pump 21, which supplies hydraulic oil to the aforementioned hydraulic actuators. In FIG. 1, the hydraulic actuators other than the boom cylinder 13 and the arm cylinder 14 are not shown for the purpose of simplifying the drawing.

The pump 21 is a variable displacement pump (a swash plate pump or a bent axis pump) whose tilting angle is changeable. The delivery flow rate of the pump 21 may be controlled by electrical positive control, or may be controlled by hydraulic negative control. Alternatively, the delivery flow rate of the pump 21 may be controlled by load-sensing control.

A boom control valve 51 is located between the pump 21 and the boom cylinder 13, and an arm control valve 31 is located between the pump 21 and the arm cylinder 14. The boom control valve 51 is connected to the pump 21 by a pump line 52, and the arm control valve 31 is connected to the pump 21 by a pump line 32. The upstream-side portion of the pump line 52 and the upstream-side portion of the pump line 32 merge together to form a shared passage.

The boom control valve 51 is connected to a tank 22 by a tank line 53, and the arm control valve 31 is connected to the tank 22 by a tank line 33. The downstream-side portion of the tank line 53 and the downstream-side portion of the tank line 33 merge together to form a shared passage.

The boom control valve 51 is connected to the boom cylinder 13 by a boom raising supply line 54 and a boom lowering supply line 55. The boom cylinder 13 extends at boom raising, and retracts at boom lowering.

The boom control valve 51 is switched between a neutral position, a boom raising position (a right-side position in FIG. 1), and a boom lowering position (a left-side position in FIG. 1). For example, the boom control valve 51 is a spool valve.

When the boom control valve 51 is in the neutral position, the boom control valve 51 blocks all of the pump line 52, the tank line 53, the boom raising supply line 54, and the boom lowering supply line 55. When the boom control valve 51 is in the boom raising position, the boom control valve 51 allows the pump line 52 to communicate with the boom raising supply line 54, and allows the boom lowering supply line 55 to communicate with the tank line 53. When the boom control valve 51 is in the boom lowering position, the boom control valve 51 allows the pump line 52 to communicate with the boom lowering supply line 55, and allows the boom raising supply line 54 to communicate with the tank line 53.

In the present embodiment, the boom control valve 51 includes: a first pilot port **5*a* to switch the boom control valve 51 from the neutral position to the boom raising position; and a second pilot port 5*b* to switch the boom control valve 51 from the neutral position to the boom lowering position. Alternatively, the boom control valve 51 may adopt, instead of the first and second pilot ports 5*a* and 5*b***, an electric actuator that is coupled to the spool.

A boom operator to receive a boom raising operation or a boom lowering operation is located in the cabin 16. A pilot pressure corresponding to an operating amount of the boom operator is introduced into the first pilot port **5*a* or the second pilot port 5*b***. Accordingly, both at boom raising and at boom lowering, the meter-in opening area and the meter-out opening area increase in accordance with increase in the operating amount of the boom operator.

The arm control valve 31 is connected to the arm cylinder 14 by an arm crowding supply line 35 and an arm pushing supply line 34. The arm cylinder 14 extends at arm crowding, which is an arm operation to bring the arm closer to the cabin 16, and retracts at arm pushing, which is an arm operation to move the arm away from the cabin 16.

The arm control valve 31 is switched between a neutral position, an arm crowding position (a right-side position in FIG. 1), and an arm pushing position (a left-side position in FIG. 1). For example, the arm control valve 31 is a spool valve.

When the arm control valve 31 is in the neutral position, the arm control valve 31 blocks all of the pump line 32, the tank line 33, the arm crowding supply line 35, and the arm pushing supply line 34. When the arm control valve 31 is in the arm crowding position, the arm control valve 31 allows the pump line 32 to communicate with the arm crowding supply line 35, and allows the arm pushing supply line 34 to communicate with the tank line 33. When the arm control valve 31 is in the arm pushing position, the arm control valve 31 allows the pump line 32 to communicate with the arm pushing supply line 34, and allows the arm crowding supply line 35 to communicate with the tank line 33.

In the present embodiment, the arm control valve 31 includes: a first pilot port **3*a* to switch the arm control valve 31 from the neutral position to the arm crowding position; and a second pilot port 3*b* to switch the arm control valve 31 from the neutral position to the arm pushing position. Alternatively, the arm control valve 31 may adopt, instead of the first and second pilot ports 3*a* and 3*b***, an electric actuator that is coupled to the spool.

An arm operator to receive an arm crowding operation or an arm pushing operation is located in the cabin 16. A pilot pressure corresponding to an operating amount of the arm operator is introduced into the first pilot port 3*a* or the second pilot port 3*b*. Accordingly, both at arm crowding and at arm pushing, the meter-in opening area and the meter-out opening area increase in accordance with increase in the operating amount of the boom operator.

The present embodiment further adopts an arm switching valve 41. The arm switching valve 41 is connected to the arm pushing supply line 34 by a rod-side line 42, and connected to the arm crowding supply line 35 by a head-side line 43. Further, the arm switching valve 41 is connected to the tank 22 by a tank line 44. The downstream-side portion of the tank line 44 merge with the aforementioned downstream-side portions of the tank lines 53 and 33 to form a shared passage.

The arm switching valve 41 is switched between a neutral position, a recycling position (a left-side position in FIG. 1), and a meter-out control position (a right-side position in FIG. 1). For example, the arm switching valve 41 is a spool valve.

When the arm switching valve 41 is in the neutral position, the arm switching valve 41 blocks all of the rod-side line 42, the head-side line 43, and the tank line 44. When the arm switching valve 41 is in the recycling position, the arm switching valve 41 allows the rod-side line 42 to communicate with the head-side line 43 and the second tank line 44. When the arm switching valve 41 is in the meter-out control position, the arm switching valve 41 allows the head-side line 43 to communicate with the tank line 44, and blocks the rod-side line 42.

In the present embodiment, the arm switching valve 41 includes: a first pilot port 4*a* to switch the arm switching valve 41 from the neutral position to the recycling position; and a second pilot port 4*b* to switch the arm switching valve 41 from the neutral position to the meter-out control position. Alternatively, the arm switching valve 41 may adopt, instead of the first and second pilot ports 4*a* and 4*b*, an electric actuator that is coupled to the spool.

At arm crowding, a pilot pressure corresponding to an operating amount of the arm operator is introduced into the first pilot port 4*a*. As a result, the arm switching valve 41 is switched to the recycling position. Consequently, the hydraulic oil discharged from the arm cylinder 14 through the arm pushing supply line 34 is, at the arm cylinder 14 side with respect to the arm control valve 31, supplied to the arm crowding supply line 35 through the rod-side line 42, the arm switching valve 41, and the head-side line 43, and thus the hydraulic oil is recycled.

The opening area of the arm switching valve 41 between the rod-side line 42 and the head-side line 43 increases in accordance with increase in the operating amount of the arm operator. Also, the opening area of the arm switching valve 41 between the rod-side line 42 and the tank line 44 increases in accordance with increase in the operating amount of the arm operator.

The arm switching valve 41 incorporates therein a check valve 45, which allows a flow from the rod-side line 42 toward the head-side line 43 but prevents the reverse flow when the arm switching valve 41 is in the recycling position. Accordingly, when the pressure of the arm crowding supply line 35 is higher than the pressure of the arm pushing supply line 34, the hydraulic oil is not recycled, whereas when the pressure of the arm crowding supply line 35 is lower than the pressure of the arm pushing supply line 34, the hydraulic oil is recycled.

On the other hand, at arm pushing, a pilot pressure corresponding to an operating amount of the arm operator is introduced into the second pilot port 4*b*. As a result, the arm switching valve 41 is switched to the meter-out control position. Consequently, the hydraulic oil discharged from the arm cylinder 14 through the arm crowding supply line 35 flows into the tank 22 not only through the arm control valve 31 and the tank line 33, but also through the head-side line 43, the arm switching valve 41, and the tank line 44.

When the arm switching valve 41 is in the meter-out control position, the opening area of the arm switching valve 41 between the head-side line 43 and the tank line 44 increases in accordance with increase in the operating amount of the arm operator. Accordingly, meter-in control by the arm control valve 31 and meter-out control by the arm switching valve 41 can be performed independently of each other. The opening area of the arm switching valve 41 between the head-side line 43 and the tank line 44 when the arm switching valve 41 is in the meter-out control position may be equal to, greater than, or less than the opening area of the arm control valve 31 between the arm crowding supply line 35 and the tank line 33.

As described above, in the drive system 1 of the present embodiment, at arm crowding, by switching the arm switching valve 41 to the recycling position, the hydraulic oil can be recycled when the pressure of the arm crowding supply line 35 is lower than the pressure of the arm pushing supply line 34. On the other hand, at arm pushing, by switching the arm switching valve 41 to the meter-out control position, meter-out control by the arm switching valve 41 can be performed independently of meter-in control by the arm control valve 31. Therefore, hydraulic oil recycling at arm crowding and independent meter-out control at arm pushing can be performed with a low-cost simple circuit that includes a small number of components and that uses, as a valve, only the arm switching valve 41, in which the check valve is incorporated.

The present disclosure is not limited to the above-described embodiment. Various modifications can be made without departing from the scope of the present disclosure.

(Summary)

A hydraulic excavator drive system according to the present disclosure includes: an arm cylinder that extends at arm crowding and retracts at arm pushing, an arm control valve connected to the arm cylinder by an arm crowding supply line and an arm pushing supply line, connected to a pump by a pump line, and connected to a tank by a first tank line; and an arm switching valve connected to the arm pushing supply line by a rod-side line, connected to the arm crowding supply line by a head-side line, and connected to the tank by a second tank line. The arm switching valve is switched between a neutral position, a recycling position, and a meter-out control position, the neutral position being a position in which the arm switching valve blocks the rod-side line, the head-side line, and the second tank line, the recycling position being a position in which the arm switching valve allows the rod-side line to communicate with the head-side line and the second tank line, the meter-out control position being a position in which the arm switching valve allows the head-side line to communicate with the second tank line. The arm switching valve incorporates therein a check valve that allows a flow from the rod-side line toward the head-side line when the arm switching valve is in the recycling position.

According to the above configuration, at arm crowding, by switching the arm switching valve to the recycling position, the hydraulic oil can be recycled when the pressure of the arm crowding supply line is lower than the pressure of the arm pushing supply line. On the other hand, at arm pushing, by switching the arm switching valve to the meter-out control position, meter-out control by the arm switching valve can be performed independently of meter-in control by the arm control valve. Therefore, hydraulic oil recycling at arm crowding and independent meter-out control at arm pushing can be performed with a low-cost simple circuit that includes a small number of components and that uses, as a valve, only the arm switching valve, in which the check valve is incorporated.

For example, each of the arm control valve and the arm switching valve may be a spool valve.

The invention claimed is:

1. A hydraulic excavator drive system comprising:

an arm cylinder that extends at arm crowding and retracts at arm pushing;

an arm control valve connected to the arm cylinder by an arm crowding supply line and an arm pushing supply line, connected to a pump by a pump line, and connected to a tank by a first tank line; and an arm switching valve connected to the arm pushing supply line by a rod-side line, connected to the arm crowding supply line by a head-side line, and connected to the tank by a second tank line, wherein the arm switching valve is switched between a neutral position, a recycling position, and a meter-out control position, the neutral position being a position in which the arm switching valve blocks the rod-side line, the head-side line, and the second tank line, the recycling position being a position in which the arm switching valve allows the rod-side line to communicate with the head-side line and the second tank line, the meter-out control position being a position in which the arm switching valve allows the head-side line to communicate with the second tank line, and the arm switching valve incorporates therein a check valve that allows a flow from the rod-side line toward the head-side line when the arm switching valve is in the recycling position.

2. The hydraulic excavator drive system according to claim 1, wherein each of the arm control valve and the arm switching valve is a spool valve.

* * * * *